UNITED STATES PATENT OFFICE.

ADOLF RÖMER, OF STUTTGART, AND LOUIS BLANGEY, OF MANNHEIM, GERMANY, ASSIGNORS, BY MESNE ASSIGNMENTS, TO THE CHEMICAL FOUNDATION, INC., A CORPORATION OF DELAWARE.

TANNING.

1,414,045.  Specification of Letters Patent.  Patented Apr. 25, 1922.

No Drawing.  Application filed September 2, 1916. Serial No. 118,286.

*To all whom it may concern:*

Be it known that we, ADOLF RÖMER and LOUIS BLANGEY, citizens of the German Empire and of the Swiss Republic, respectively, residing at Stuttgart and Mannheim, respectively, Germany, have invented new and useful Improvements in Tanning, of which the following is a specification.

As is known, the vegetable tanning materials employed for tanning hides without exception possess an amorphous character. We have now found that we can transform hides into a valuable leather by means of crystalline water-soluble organic bodies containing an acid group such as sulfonic or carboxylic acid groups or both such groups, and capable of precipitating glue or gelatine from solutions thereof. All such bodies can be used either alone or together with natural or synthetic tanning materials of other kind or mixed with non-tanning materials.

The process of tanning with the aid of substances of the aforesaid character can be carried out in watery solution in the usual manner and in order to further illustrate the invention by some examples, we mention in the following a number of substances which can be used for the purpose of the present invention and, inasmuch as necessary, the process by which they can be prepared, but the invention is of course not confined to the use of the compounds quoted. The parts are by weight.

Example I.

Dissolve at ordinary temperature 50 parts of dihydroxy-ditolyl-methane

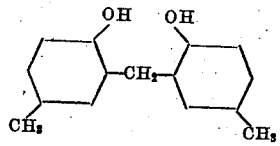

(which is obtainable by condensing para-homosaligenine—see Auwers Berichte vol. 40, page 2531—with p-cresol by means of hydrochloric acid and can be purified by distilling the raw product in vacuo, and represents colorless crystals melting at 126° C.) in 200 parts of sulfuric acid of 66° Bé. and allow to stand until a test on dilution with ice-water will give a clear solution. Then pour on 400 parts of ice and saturate with common salt. The sodium salt of the sulfonic acid produced is thereby precipitated in a fine crystalline form. This is filtered off, washed with a solution of common salt, pressed and dried. The solution serving for the tanning process is prepared by dissolving the product in water and adding a little sulfuric acid.

Example II.

Dissolve 268 parts of α-dinaphthylmethane (Grabowski, Berichte der Deutschen Chemischen Gesellschaft vol. 7, p. 1605) in 2000 parts of nitrobenzene and treat at a temperature of 10° C. with 250 parts of chlorosulfonic acid. When sulfonation is complete, pour the mass into water, separate the nitrobenzine and neutralize the acid solution with barium carbonate. The solution of the barium salt formed is then filtered when still hot and evaporated while stirring until crystallization begins. The barium salt separated out is washed with cold water and transformed into the free sulfonic acid by adding exactly the required quantity of sulfuric acid. The free sulfonic acid can be obtained in the form of large well-shaped crystals by carefully evaporating at 80° C., finally in vacuo, or by precipitating the concentrated aqueous solution with strong hydrochloric acid. The aqueous solution can be employed for tanning directly without adding another acid.

In quite an analogous manner sulfonic acids of 4.4'-dihydroxy-diphenylmethane (F. P. 158–160° C.), or of 4.4'-dihydroxy-diphenyl-dimethylmethane (Annalen der Chemie vol. 343, p. 85), or of 4.4'-dihydroxy-3.3'-dimethyldiphenyl-dimethylmethane (Annalen der Chemie vol. 400, p. 33), or of 4.4'-dihydroxy-3.3'-dimethyl-diphenylmethane can be prepared which sulfonic acids separate out after evaporating the aqueous solutions, at once or when allowed to stand for some time, in a crystalline form; the watery solution of the crystals can be used for tanning.

Sulfonic acids of hydroxy-dinaphthylmethane can also be employed.

Example III.

Dissolve 448 parts of 2.6-naphthol-sulfonic acid in 2500 parts of sulfuric acid of 40% and add 100 parts of formaldehyde of 30% while stirring and at a temperature of 80° C. The condensation product formed crystallizes at once in the form of glittering leaves. Continue with stirring until the smell of formaldehyde has disappeared and filter off when cold. The pressed cake is dissolved in water and can then be employed for tanning, if desired, after partial neutralisation.

*Example IV.*

A tanning bath is prepared while using a sulfonic acid as can be prepared by treating the condensation product of meta-cresol, para-cresol or alpha-naphthol and acetone (Annalen der Chemie vol. 388, p. 304; Berichte der Deutschen Chemischen Gesellschaft vol. 25, referate p. 336) with fuming sulfuric acid or chlorosulfonic acid, or by treating for several hours on the water-bath 128 parts of 4.4'-dihydroxy-3.3'-dimethyl-diphenyl-dimethylmethane with 252 parts of crystallized sodium sulfite dissolved in 1000 parts of water and 100 parts of 30% formaldehyde.

*Example V.*

Dissolve 228 parts of 6.6'-dihydroxy-3.3'-dimethyl-diphenylmethane in 1200 parts of nitrobenzene and add slowly, at a temperature of from 0° to 5° C., 117 parts of chlorosulfonic acid. Allow to stand for 3 to 4 hours, then drive out the hydrogen chlorid dissolved and extract the sulfonic acid from its solution in nitrobenzene by shaking with water. The aqueous solution obtained can be directly employed for tanning, or if desired the sulfonic acid can be precipitated therefrom by evaporating and saturating with gaseous hydrochloric acid.

*Example VI.*

A tanning solution is prepared with the aid of a disulfonic acid obtained as follows: Dissolve 168 parts of para-cresol-dialcohol in 1000 parts of para-cresol, then add 25 parts of concentrated hydrochloric acid. The temperature will rise somewhat and on cooling the condensation product formed crystallizes out and can be completely precipitated by adding gasoline. Re-crystallized from glacial acetic acid the product has the F. P. 215° C. 87 parts of this product are suspended in 400 parts of nitrobenzene and 59 parts of chlorosulfonic acid are added, whilst stirring and cooling with ice. The disulfonic acid formed will soon separate in the form of small needles.

*Example VII.*

Treat hides in the usual way with an aqueous solution of 5.5'-dihydroxy-2.2'-dinaphthylamine-7.7'-disulfonic acid (obtainable according to example 2 of German Letters Patent No. 114,974).

*Example VIII.*

50 parts of 4.4'-dihydroxy-benzophenone (Annalen der Chemie vol. 218, p. 354) are dissolved in 200 parts of sulfuric acid monohydrate, then 150 parts of fuming sulfuric acid containing 23% $SO_3$ are added and the mixture is stirred at ordinary temperature, until a test portion is clearly soluble in water. The sulfonic acid can be obtained in a pure free state by decomposing its barium salt by the required quantity of sulfuric acid; the aqueous solution thereof can be used directly for tanning.

*Example IX.*

Treat hides in the usual way with an aqueous solution of anthraquinone-beta-sulfonic or 2.6-disulfonic acid or 1.4-dichloro-anthraquinone sulfonic acid, or hydroxy- or nitro-anthraquinone sulfonic acids or naphthanthraquinone sulfonic acids or with the respective salts in the presence of acid.

While compounds such as the afore-described, possessing the above stated characteristic properties and containing in their molecule more than one aromatic nucleus connected by one or more polyvalent atoms, are particularly suitable for the claimed process, other crystalline water-soluble aromatic compounds containing sulfonic or carboxylic acid groups and capable of precipitating glue, or gelatine, solutions are also suitable for the purpose of the present invention. Instances of such compounds are naphthol- or naphthylamine sulfonic acids capable of precipitating glue, such as 1.4-naphthol sulfonic acid, 2.6-naphthol-sulfonic acid, 1.2.4- or 2.1.5- naphthylamine-disulfonic acids, etc.

The following procedure sets forth an illustrative embodiment of a manner in which my invention may be carried into practice:

100 parts of the sulphonate prepared as set forth in Example I may be dissolved in 1600 parts of water, to which may be added about 75 parts of dilute sulphuric acid having strength of about 10%, the hides having been well limed and bated, are introduced into the vat containing a solution as prepared above and are allowed to remain in the vat for a period of from 8 to 12 days. The leather thus obtained is subsequently dried and treated with fat in the usual manner.

We claim:

1. The process of tanning which comprises treating hide in a bath containing an aromatic sulfonic acid derived from an aromatic hydrocarbon containing within its molecule at least two aromatic nuclei, said nuclei being united by at least one polyvalent atom.

2. The process of tanning which comprises treating hide in a bath containing an aromatic sulfonic acid derived from an aromatic hydrocarbon containing within the molecule at least two aromatic nuclei, said nuclei being united by at least one carbon atom.

3. The process of tanning which comprises treating hide in a bath containing a sulfonated derivative of a diarylmethane.

4. The process of tanning which comprises treating hide in a bath containing a sulfonated derivative of dihydroxy-ditolylmethane.

5. The process of tanning which comprises treating hide in a bath containing a dihydroxy-ditolyl sulfonate and sulfuric acid.

6. A tanning substance comprising a sulfonated derivative of an aromatic hydrocarbon containing within its molecule at least two aromatic nuclei united by at least one polyvalent atom, said derivative being soluble in water, capable of precipitating glue from solution, and having a crystalline structure.

7. A tanning substance comprising a sulfonated derivative of an aromatic hydrocarbon containing within its molecule at least two aromatic nuclei united by at least one carbon atom, said derivative being soluble in water, capable of precipitating glue from solution, and having a crystalline structure.

8. A tanning substance comprising a sulfonated derivative of a diarylmethane, said derivative being soluble in water, capable of precipitating glue from solution, and having a crystalline structure.

9. A tanning substance comprising a sulfonated derivative of dihydroxy-ditolylmethane, said derivative being soluble in water, capable of precipitating glue from solution, and having a crystalline structure.

10. A tanning substance comprising a dihydroxy-ditolylmethane sulfonate, being soluble in water, capable of precipitating glue from solution, and having a crystalline structure.

In testimony whereof we have hereunto set our hands in the presence of subscribing witnesses.

DR. ADOLF RÖMER.
LOUIS BLANGEY.

Witnesses as to Dr. Adolf Römer:
  FRIDA KLAIBER,
  PAULINE MÜLLER.

Witnesses as to Louis Blangey:
  ARTHUR DENONVILLE,
  RUTH P. MANN.